(12) United States Patent
Khuri-Yakub et al.

(10) Patent No.: US 9,774,277 B2
(45) Date of Patent: Sep. 26, 2017

(54) ENERGY HARVESTING (71) Applicant: The Board of Trustees of the Leland Stanford Junior University, Palo Alto, CA (US)

(72) Inventors: Butrus T. Khuri-Yakub, Palo Alto, CA (US); Omer Oralkan, Morrisville, NC (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 712 days.

(21) Appl. No.: 14/079,380

(22) Filed: Nov. 13, 2013

(65) Prior Publication Data

US 2014/0133279 A1     May 15, 2014

Related U.S. Application Data (60) Provisional application No. 61/725,875, filed on Nov. 13, 2012.

(51) Int. Cl.
*H01L 41/113*     (2006.01)
*H02N 2/18*     (2006.01)

(52) U.S. Cl.
CPC .................................... *H02N 2/18* (2013.01)

(58) Field of Classification Search
CPC ...................................................... H02N 2/18
USPC ........................................................ 367/178
See application file for complete search history.

(56) References Cited

U.S. PATENT DOCUMENTS

| 5,300,875 | A | 4/1994 | Tuttle |
| 5,889,383 | A | 3/1999 | Teich |
| 6,798,716 | B1 | 9/2004 | Charych |
| 6,894,460 | B2 | 5/2005 | Clingman |
| 7,116,036 | B2 | 10/2006 | Balasubramaniam et al. |
| 2008/0146871 | A1* | 6/2008 | Arneson .............. A61B 5/0002 600/101 |
| 2008/0300660 | A1* | 12/2008 | John .................... A61N 1/3785 607/61 |
| 2009/0171404 | A1* | 7/2009 | Irani ...................... A61N 1/056 607/2 |

(Continued)

OTHER PUBLICATIONS

L. Mateu and F. Moll, "Review of Energy Harvesting Techniques and Applications for Microelectronics," Proceedings of SPIE vol. 5837, pp. 359-373, 2005.

(Continued)

*Primary Examiner* — James Hulka
*Assistant Examiner* — John T Nolan
(74) *Attorney, Agent, or Firm* — Crawford Maunu PLLC (57)     ABSTRACT

As may be implemented in accordance with one or more embodiments, an apparatus and/or method involves a plurality of transducer elements that convert energy waves conveyed via a multi-directional radiation pattern into electrical charge. A power-accumulation circuit accumulates electrical charges from each of the plurality of transducer elements, with each of the transducer elements being arranged at different respective off-axis angles relative to an axis at which the energy is being conveyed. The power-accumulation circuit accumulates energy from each of the individual energy-transduction areas, such that energy received at different respective off-axis angles contributes to the accumulation of electrical charge.

20 Claims, 4 Drawing Sheets

(56) References Cited

U.S. PATENT DOCUMENTS

| | | | | |
|---|---|---|---|---|
| 2009/0195226 A1* | 8/2009 | Abramovich | H02N 2/18 | 322/2 R |
| 2009/0204178 A1* | 8/2009 | Dlugos, Jr. | A61F 5/0059 | 607/61 |
| 2009/0204179 A1* | 8/2009 | Dlugos, Jr. | A61F 5/0059 | 607/61 |
| 2010/0117488 A1* | 5/2010 | Wang | H02N 2/18 | 310/339 |
| 2010/0234792 A1* | 9/2010 | Dacey, Jr. | A61L 2/0011 | 604/8 |
| 2010/0234924 A1* | 9/2010 | Willis | A61N 1/3787 | 607/63 |
| 2010/0249882 A1* | 9/2010 | Houben | A61N 1/37217 | 607/60 |
| 2010/0294976 A1* | 11/2010 | Ajayan | H01L 41/113 | 252/62.9 PZ |
| 2010/0308592 A1* | 12/2010 | Frayne | H02N 2/185 | 290/54 |
| 2010/0314968 A1* | 12/2010 | Mohamadi | H02N 2/186 | 310/319 |
| 2010/0331915 A1* | 12/2010 | Hill | A61N 1/37217 | 607/60 |
| 2011/0004059 A1* | 1/2011 | Arneson | A61B 1/00041 | 600/109 |
| 2011/0144573 A1* | 6/2011 | Rofougaran | A61B 5/411 | 604/66 |
| 2011/0163636 A1* | 7/2011 | Sirbuly | B82Y 30/00 | 310/339 |
| 2014/0094891 A1* | 4/2014 | Pare | A61N 1/37 | 607/119 |
| 2014/0206927 A1* | 7/2014 | Weinberg | A61B 18/1206 | 600/9 |
| 2014/0303688 A1* | 10/2014 | Kulah | A61N 1/3785 | 607/57 |

OTHER PUBLICATIONS

S. Sherrit, "The Physical Acoustics of Energy Harvesting," Proc. IEEE Ultrason. Symp., pp. 1046-1055, 2008.

Amirtharajah and A. Chandrakasan, "Self-powered signal processing using vibration-based power generation," Solid-State Circuits, IEEE Journal of, 33(5), pp. 687-695, 1998.

S. Meninger, J. Mur-Miranda, R. Amirtharajah, A. P. Chandrakasan, and J. H. Lang, "Vibration to electric energy conversion," IEEE Trans. on VLSI, 9, Feb. 2001.

* cited by examiner

ENERGY HARVESTING

FIELD

Aspects of various embodiments are directed to energy harvesting applications, such as by harvesting acoustic and/or mechanical waves as electrical energy.

BACKGROUND

Wireless energy transmission to remote devices and energy harvesting from ambient energy sources are topics that attracted increased attention in a variety of applications, such as in mobile communication, computation devices and microsensor technologies. Various devices convert kinetic, electromagnetic or thermal energy into electrical energy to power electronic circuits. For instance, energy harvesting and transmission systems based on transformation of acoustic vibrations into electrical energy are also increasingly being used.

However, various energy harvesting systems and related approaches have been challenging to implement in various applications. For instance, harvesting sufficient energy can be difficult, particularly where an energy source may be inconsistent, as may relate to the ability to efficiently communicate (send and/or receive) energy. For energy harvesting applications employing transducers, transducer area may be increased to increase communicated power. However, increasing transducer area can reduce the acceptable angle via which power can be communicated, which can in turn decrease communicated power. For instance, when the size of a transducer is larger than the acoustic wavelength, the transducer becomes highly directional and may be limited in sensitivity to waves directly radiating from the normal direction. While acoustic energy harvesting can be performed at low frequencies (e.g., in the kHz range) where the wavelength is typically comparable to or larger than the physical transducer size, such an approach can render it difficult to generate high power. These and other matters have presented challenges to energy transmission, for a variety of applications.

SUMMARY

Various example embodiments are directed to energy transmission and/or energy harvesting circuits and their implementation.

In accordance with one or more embodiments, an apparatus includes a plurality of transducer elements arranged at different respective off-axis angles relative other ones of the transducer elements. Each transducer element generates current using energy received via acoustic waves. A first rectifier-type circuit rectifies the generated current, and another charge-collection-type circuit accumulates electrical charge from all of the transducer elements, using the rectified current. Energy conveyed to each of the transducers at the different respective off-axis angles thus contributes to the accumulation of electrical charge. Accordingly, acoustic energy is conveyed using multiple transducers, which may be implemented to facilitate the transmission of high energy levels, while being respectively arranged to accommodate off-axis transmission (e.g., to mitigate alignment issues).

In accordance with another embodiment, an apparatus includes transducer elements that provide a collective energy-transduction area, and a power-accumulation circuit that accumulates electrical charges from the transducer elements. The energy-transduction area corresponds to individual energy-transduction areas respectively defined by the transducer elements. Each of the transducer elements converts energy conveyed via a multi-directional radiation pattern into electrical charge. The transducer elements are arranged at different respective off-axis angles relative to an axis at which the energy is being conveyed, and the power-accumulation circuit accumulates energy from each of the individual energy-transduction areas. In some implementations, one or more such transducer elements are aligned with the axis at which the energy is conveyed. In this regard, waves conveyed from the energy source and reaching the individual energy-transduction areas at different respective off-axis angles contribute to the accumulation of electrical charges.

Another embodiment is directed to a method as follows. A collective energy-transduction area is provided via a plurality of transducer elements, in which the collective energy-transduction corresponds to a plurality of individual energy-transduction areas respectively defined by the plurality of transducer elements that convert energy conveyed via a multi-directional radiation pattern into electrical charge. Each of the transducer elements is arranged at different respective off-axis angles relative to an axis at which the energy is being conveyed. Electrical charges are accumulated from each of the transducer elements, such that waves conveyed from the energy source reach the plurality of individual energy-transduction areas at the different respective off-axis angles and contribute to the accumulation of electrical charges.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings, in which.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving energy harvesting, such as by converting acoustic or mechanical waves to electrical energy. Such approaches can be implemented to mitigate or eliminate issues such as those described in the background above. While not necessarily so limited, various aspects may be appreciated through a discussion of examples using this context.

Various example embodiments are directed to the communication of energy, as may involve acoustic waves and/or mechanical waves (e.g., vibrations), and the conversion of such energy using a transducer that provides electrical power as an output. Certain embodiments are directed to the conversion of acoustical and/or mechanical waves into an electrical charge or current, which can be used for a variety of applications. Multiple transducers are used to communicate the energy, with each transducer facilitating communication of a portion of the communicated energy. In some embodiments, the waves are converted into AC electrical signals, which are subsequently conditioned to provide DC power to a device or to provide power and/or charge a battery. With such approaches, alignment of the energy communication with the respective waves is facilitated, such as by enhancing the ability to collect waves transmitted at various angles/axes relative to the transducers.

Various embodiments are directed to mitigating issues as described above, relating to both angle of power communication as well as enhancing the amount of power that can be communicated. In some embodiments, an acoustic transducer has a plurality of elements, such as an array of elements, in which converted energy harvested by individual elements are summed (e.g., incoherently, such as via rectifying) to provide an overall transducer output pertaining to converted energy. With this approach, energy can be gathered from the full area of a transducer, with an acceptance angle as determined by individual transducer element areas (which can be much smaller than the total transducer area).

In some embodiments, each transducer includes an incoherence detection circuit that substantially removes linearity of the transducer's output with respect to signals. For example, a diode can be employed to provide per-element nonlinearity. The outputs of all of the incoherent detection circuits are summed to provide a power output. Using this approach, energy of different sign/polarity as harvested by respective transducers can be combined, which can be useful for mitigating cancelling effects.

Certain embodiments are directed to methods and apparatuses for wireless transmission of energy by using acoustical waves, as may be used to remotely power devices with no power source (e.g., without a battery), or to remotely recharge batteries powering electronic circuits. These methods and apparatuses can also be used to harvest the ambient vibrational energy and convert it to electrical energy. Such approaches may, for example, be used to power implantable devices such as devices within a human or animal.

In some embodiments, relatively high acoustic frequencies are used to transmit energy, making enhanced power available in a displacement-limited setting. In some implementations, an optimum transmission frequency is determined for wireless power transmission using acoustic waves, based upon attenuation increases in whatever medium is employed, at higher frequencies. In some embodiments, a transmitter-receiver system is optimized for such a frequency using impedance matching between an electrical power source and a transmitting acoustic transducer, and similar matching between a receiving transducer and incoherent detection circuitry as discussed above. In further implementations, the acoustic impedance of the transmitting and receiving transducers is also matched to the impedance of the medium being employed for transmitting the acoustic waves. In some implementations, low frequencies are also implemented to harvest energy from ambient vibrations that occur at low frequencies.

Various embodiments are directed to an apparatus having a plurality of transducer elements that provide a collective energy-transduction area, and a power-accumulation circuit that accumulates electrical charges from the transducer elements. The transducer elements may, for example, be arranged adjacent one another, such as in an array, and/or differently spaced. The energy-transduction area corresponds to a plurality of individual energy-transduction areas respectively defined by the plurality of transducer elements, in which each of the transducer elements converts energy conveyed via a multi-directional radiation pattern into electrical charge (e.g., by converting sound pressure and/or mechanical vibration). The transducer elements are arranged at different respective off-axis angles relative to an axis at which the energy is being conveyed, and the power-accumulation circuit accumulates energy from each of the individual energy-transduction areas. In some implementations, some or all of the transducer elements are aligned with the axis at which the energy is conveyed. In this regard, waves conveyed from the energy source and that reach the individual energy-transduction areas at different respective off-axis angles contribute to the accumulation of electrical charges.

Accordingly, various embodiments are directed to accumulating electrical charges, in which transducers generate a current (charge flow) in response to an incoming acoustic wave or mechanical disturbance. The current is rectified in each transducer and used to charge a capacitor, such as an electrochemical capacitor (e.g., a supercapacitor). The stored charge can then be used to power a battery or a device. Such an approach can involve powering an implanted or otherwise inaccessible device without using a battery, or for recharging a battery without electrically contacting the device. In some applications, a supercapacitor is used with a long-term energy storage component.

In some embodiments, impedance-matching is used to facilitate the communication of energy. For instance, energy may be conveyed at a specific wavelength that impedance-matches a material in each of the plurality of transducer elements, with each of the transducer elements being sufficiently small to convert a sufficient amount of the energy at the specific wavelength. Such a sufficient amount of energy may involve, for example, achieving transduction to harvest a specified amount of power, after the energy is attenuated through a given attenuation medium.

In some embodiments, one or more transducer elements converts conveyed energy that is different in phase from the conveyed energy as received by another one of the plurality of transducer elements. The power-accumulation circuit accumulates the electrical charges by rectifying a voltage corresponding to energy received via the at least one of the plurality of transducer elements.

The transducer elements and power-accumulation circuit may be implemented using one or more of a variety of approaches. In some implementations, one or more of the transducer elements is impedance-matched with the power-accumulation circuit. In other implementations, one or more of the transducer elements has a size that is smaller than a wavelength of the conveyed energy, which can be used to facilitate high-power transmission. In certain implementations, one or more of the transducer elements converts acoustic waves into current flow, and charges a capacitor via the current flow.

In another embodiment, the transducer elements and/or another circuit rectify current flow generated at the transducer elements, via which a charge having a common polarity is provided/facilitated, relative to charge provided by the other transducers. In some embodiments, the power-accumulation circuit and transducer elements charge one or more capacitors via the current flow, with the current flow in at least one of the transducer elements being rectified to provide a charge of a common polarity, and a circuit is powered using charge stored on the at least one capacitor.

Various embodiments as described in connection with apparatuses and circuits herein may be implemented with method-based approaches. In one embodiment, a collective energy-transduction area is provided using transducer elements, in which the collective energy-transduction area corresponds to a plurality of individual energy-transduction areas defined by the transducer elements. Using the transducer elements, energy conveyed via a multi-directional radiation pattern (e.g., mechanical waves or sound pressure waves) is converted into electrical charge, with each of the transducer elements being arranged at different respective off-axis angles relative to an axis at which the energy is being conveyed. Electrical charges are accumulated from the plurality of transducer elements. In this regard, waves conveyed from the energy source reach the plurality of individual energy-transduction areas at the different respective off-axis angles, and contribute to the accumulation of electrical charges.

In a more particular embodiment, a size and number of the transducer elements are selected based upon a defined or selected power, and a depth of implantation into a human body (e.g., for a biomedical device). The transducer elements are used to convert energy conveyed via tissue in the human body.

In some embodiments, conveyed energy collected at respective ones of the transducer elements is of a different phase, and a current corresponding to the energy is rectified such that the energy collected at each transducer augments the total energy collected. For instance, acoustic waves may be converted into current flow that is rectified and used to charge a capacitor. The charged capacitor can be used to power a circuit and/or charge a battery.

Figure 1A:
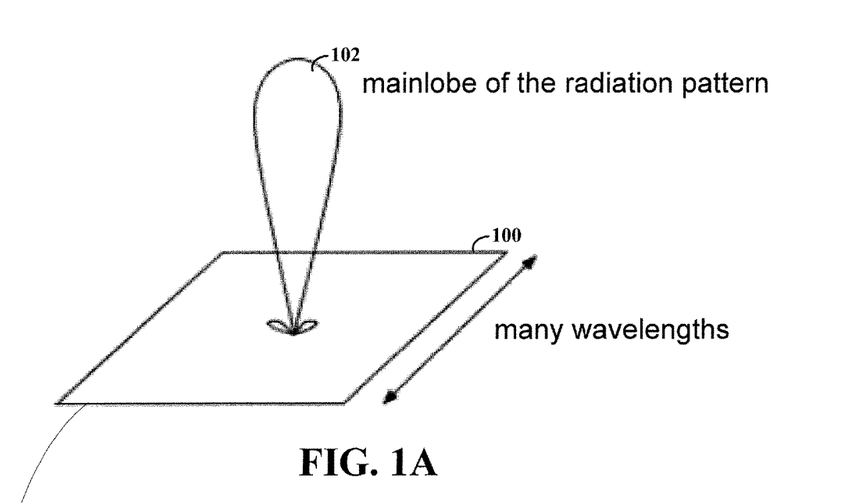
FIG. 1A and FIG. 1B show approaches involving the communication of energy via an acoustic or mechanical wave, in accordance with one or more embodiments.
Figure 1B:
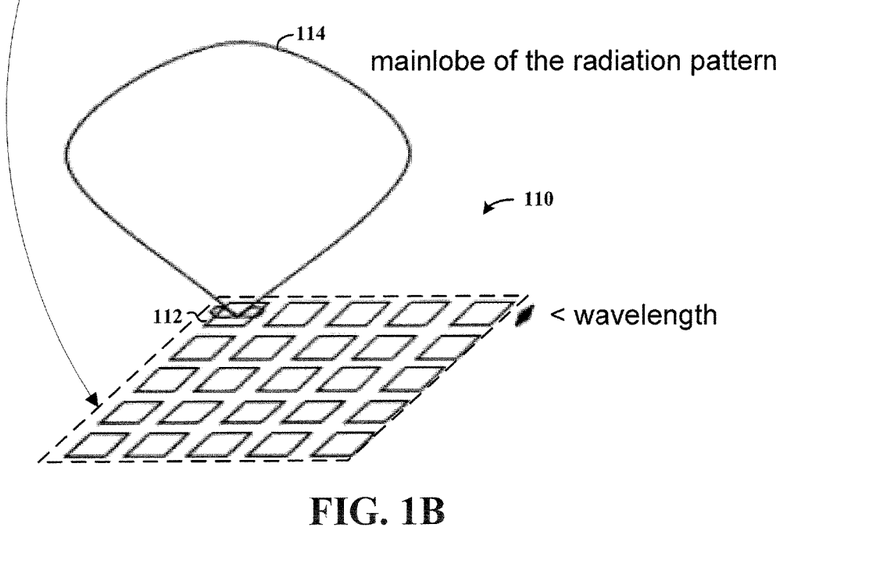

Turning now to the Figures, FIGS. 1A and 1B show approaches involving the communication of energy via an acoustic or mechanical wave, in accordance with one or more embodiments. FIG. 1A shows a transducer 100 and a main lobe 102 of a radiation pattern therewith. FIG. 1B shows a transducer array 110 of similar size to transducer 100, but including multiple transducer elements (with element 112 labeled by way of example). The smaller transducer elements have a much larger main lobe 114 of radiation, facilitating desirable reception of power. For instance, the transducer elements in the array 110 may be configured with a size that is smaller than the wavelength of energy harvested by the transducers. Moreover, the respective transducer elements can be aligned differently relative to one another and an axis along which acoustic or mechanical waves are transmitted, facilitating off-axis reception. Various embodiments are thus directed to systems in which power communicated via waves is harvested using an array of transducers 110 as shown in FIG. 1B, facilitating reception of energy transmitted at different angles and/or a relatively narrow lobe (e.g., as in FIG. 1A).

The embodiments described in connection with FIGS. 1A and 1B may, for example, be implemented for wireless power harvesting at high acoustic frequencies. By implementing transducer array elements having a size that is smaller than an acoustic wavelength, a broad acceptance angle is achieved. The received signals can be added incoherently to mitigate destructive construction for acoustic waves arriving from an off-axis angle, where only waves arriving in the normal direction add up constructively. As such, waves coming from off-axis angles contribute to the total collected power. In some implementations, this array 110 is used as a transmitter to create a broad acoustic field, and in other implementations the array is used to receive power from a directional transmitter.

Figure 2:
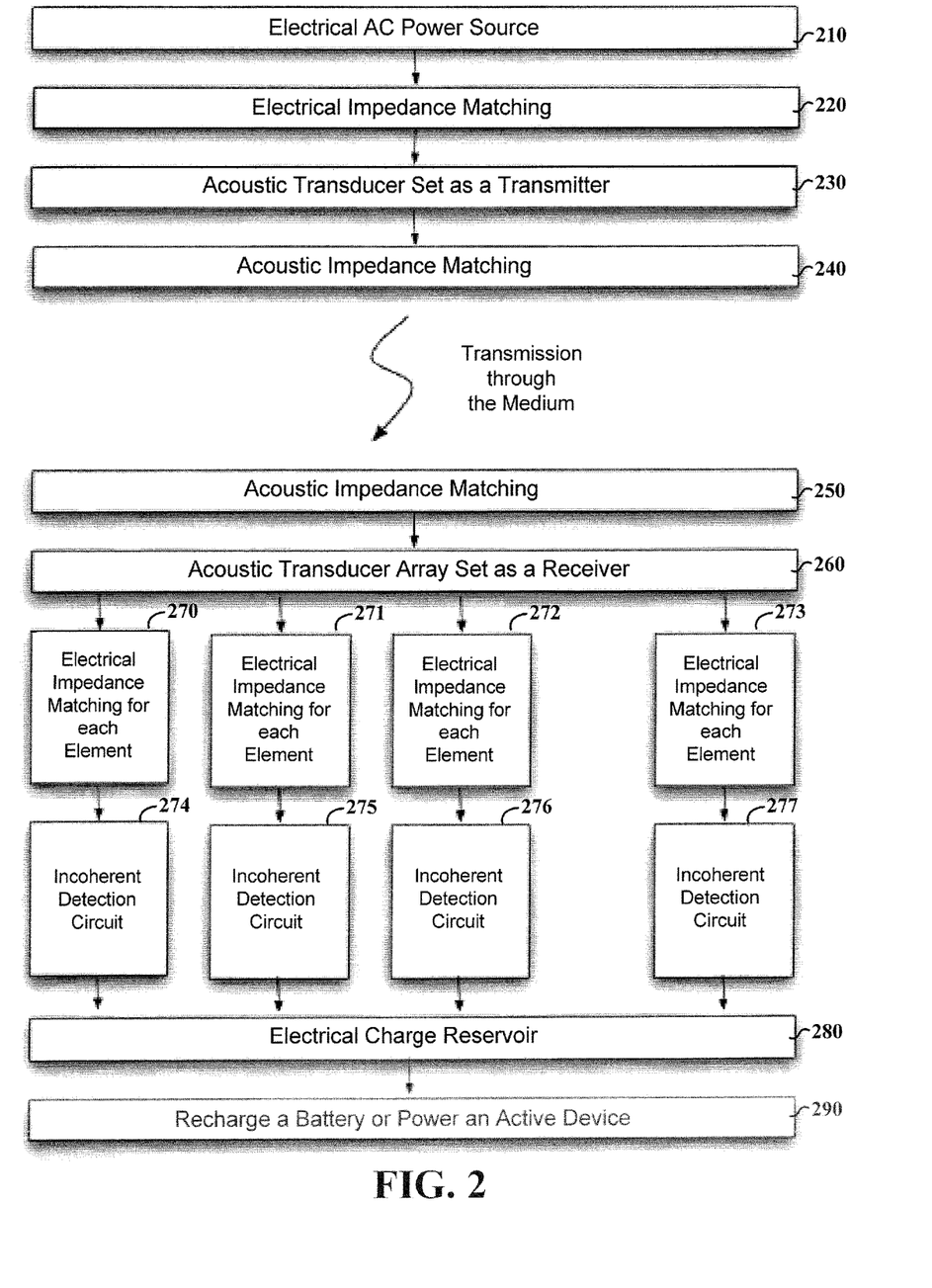
FIG. 2 depicts a wireless power transmission system, in accordance with another example embodiment of the present invention.

FIG. 2 depicts a wireless power transmission system, in accordance with another example embodiment of the present invention. It should be noted that one or more aspects of the system may be implemented with separate embodiments, such as with embodiments involving a transmitter, embodiments involving a receiver, embodiments involving particularly circuits within a transmitter and/or receiver, and embodiments involving both a transmitter and receiver.

A transmitter shown in FIG. 2 includes an electrical (AC) power source 210 and an acoustic transducer transmitter 230. In some implementations, the transmitter includes one or both of an electrical impedance matching circuit 220 and an acoustic impedance matching circuit 240, which may be implemented in accordance with one or more embodiments herein.

A receiver in FIG. 2 operates to receive power transmission from the transmitter via a medium, and includes a plurality of acoustic transducers 260, (e.g., an array as indicated by way of example), incoherence detection circuits 274-277, and an electrical charge reservoir 280 that provides power and/or recharges a battery at 290. Additional or fewer transducers and related incoherence detection circuits are implemented, to suit particular applications. The incoherence detection circuit(s) may, for example, include a transformer and a series diode, which may feed charge into the same charge reservoir, which may be implemented as a capacitor. In some implementations, the incoherence detection circuit includes a rectifier circuit having a diode and a capacitor. When the voltage amplitude is small, a transformer can also be used to convert the received voltage to a higher voltage so that it can be rectified by a half-wave rectifier formed by a diode-capacitor combination. In some implementations, before powering a load the voltage is regulated using a low power DC/DC switching converter. In some implementations, the receiver also includes an acoustic impedance matching circuit 250 and/or one or more electrical impedance matching circuits 270-273 (e.g., or one such circuit for all transducers).

Figure 3:
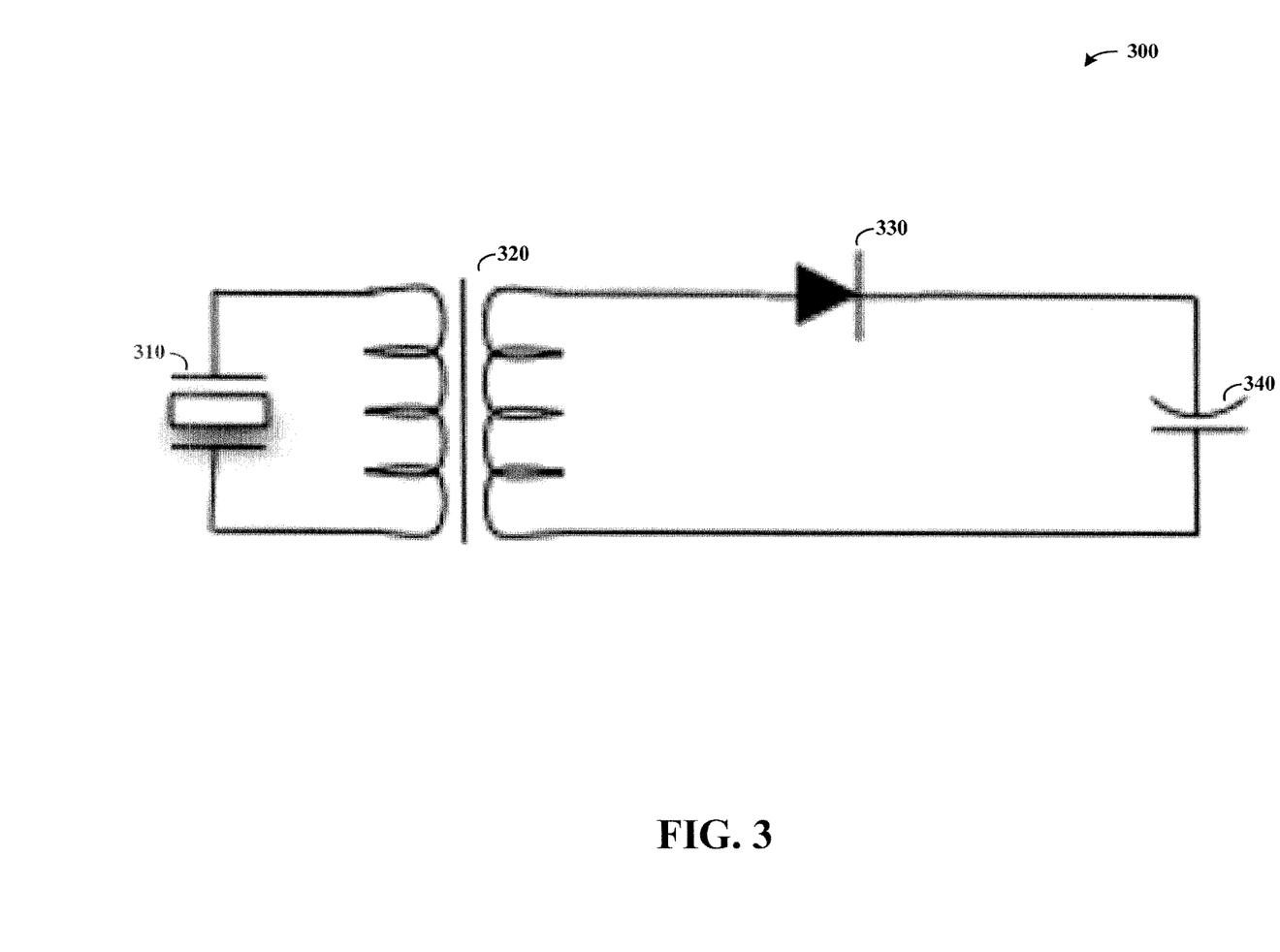
FIG. 3 shows an example charge reservoir circuit, in accordance with another example embodiment of the present invention.

A variety of charge reservoir circuits may be used to suit particular applications. FIG. 3 shows one example charge reservoir circuit 300, as may be implemented with block 280 of FIG. 2, in accordance with another example embodiment. The circuit 300 includes a transformer 320 with series diode 330 and capacitor 340, which stores charge provided at 310 (e.g., via a transducer as shown in FIG. 1 or 2).

Figure 4:
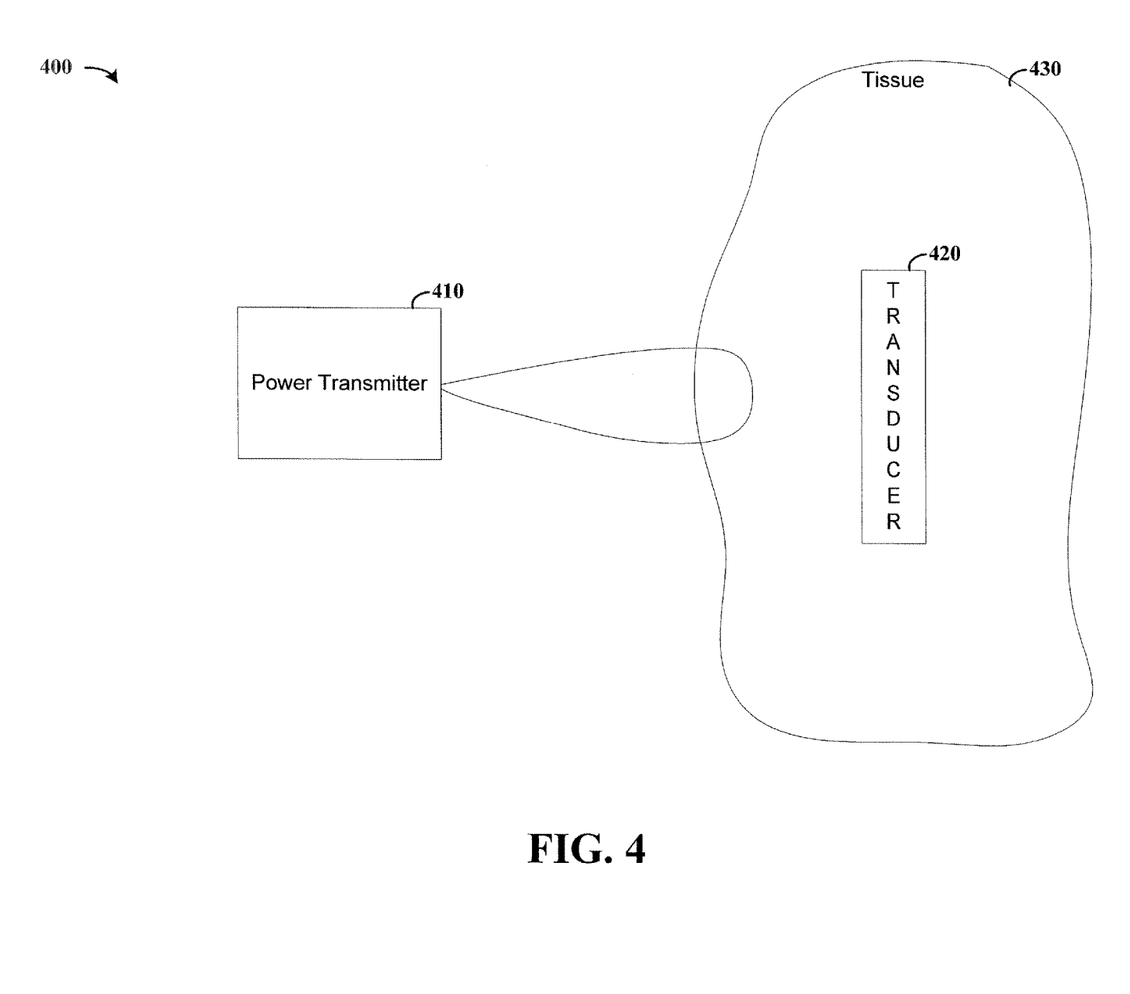
FIG. 4 shows an implementation involving power communication with an apparatus implanted within tissue, in accordance with another example embodiment of the present invention.

FIG. 4 shows an implementation 400 involving power communication with an apparatus implanted within tissue, in accordance with another example embodiment of the present invention. A power transmitter 410 transmits acoustic waves to a transducer 420, which is embedded within tissue 430, such as within a human. Such an approach may involve, for example, embedding and powering a device including the transducer 420, such as for powering a biomedical device.

Various embodiments, as may be implemented in connection with one or more other embodiments described herein, are directed to the use of single element acoustic transducers in which energy transmission is through acoustic waves, or using a pair of antennas where the energy transmission is through radio-frequency electromagnetic waves. These approaches may involve, for example, one or more of eliminating a need for transmitter and receiver alignment, and using of higher frequencies for wireless power transmission (facilitating greater power transmission).

Various embodiments as described herein may be implemented in connection with approaches involving wireless power transmission to remote or isolated locations in which local long-term power is unavailable, such as with mobile communication devices, embedded and distributed sensors, and medical implants. Other embodiments may be implemented in connection with wireless power transmission to devices inside sealed and/or rotating systems in which cabling and electrical commutation are problematic or undesirable. Further, power transmission can be effected through various media by optimizing transducer design, such as for one or more of a gas, liquid or solid, or via tissue.

Various types of transducers may be implemented, in accordance with one or more embodiments herein. For instance, piezoelectric transducers or silicon-based micromachined transducers can be used, as may employ, e.g., microlithography-based shape definition and integration with electronic circuits. In some implementations, piezoelectric transducers are used with no DC biasing or precharging. Capacitive micromachined ultrasonic transducers are used in various implementations, such as may involve either constant-voltage or constant-charge operation modes. Further, the various embodiments involving acoustic transducers may be implemented without phased-array operation, for harvesting ambient vibration energy or for reception of transmitted ultrasonic energy and its conversion into electrical energy.

Various blocks, modules or other circuits may be implemented to carry out one or more of the operations and activities described herein and/or shown in the figures. In these contexts, a "block" (also sometimes referred to as "logic circuitry" or "module") is a circuit that carries out one or more of these or related operations/activities (e.g., as depicted in one or more blocks, or circuit components, as shown in FIG. 2). For example, in certain of the above-discussed embodiments, one or more modules are discrete logic circuits or programmable logic circuits configured and arranged for implementing these operations/activities, as in the circuit modules shown in FIG. 2. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions, and the second module includes a second CPU hardware circuit with another set of instructions.

Certain embodiments are directed to a computer program product (e.g., non-volatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, impedance matching type circuits may be implemented as discussed. In addition, circuits and related functions described in connection with receiving power may be implemented with the transmission of power. In addition, the various embodiments described herein may be combined in certain embodiments, and various aspects of individual embodiments may be implemented as separate embodiments. Such modifications do not depart from the true spirit and scope of various aspects of the invention, including aspects set forth in the claims.

What is claimed is:

1. An apparatus comprising:
   a plurality of transducer elements configured and arranged to provide a collective energy-transduction area corresponding to a plurality of individual energy-transduction areas respectively defined by the plurality of transducer elements, each of the plurality of transducer elements having a size that is smaller than a wavelength of energy conveyed and being configured and arranged to convert the energy waves conveyed and received via a multi-directional radiation pattern into electrical charge, and at least one of the plurality of transducer elements being configured and arranged to convert conveyed energy that is different in phase from the conveyed energy as received by another one of the plurality of transducer elements;
   a power-accumulation circuit configured and arranged to accumulate electrical charges from each of the plurality of transducer elements; and
   each of the plurality of transducer elements is configured and arranged at different respective off-axis angles relative to other ones of the transducer elements, and wherein the power-accumulation circuit is configured and arranged to accumulate energy from each of the individual energy-transduction areas such that the energy waves reaching the plurality of individual energy-transduction areas at different respective off-axis angles contribute to the accumulation of electrical charges by rectifying a current corresponding to energy received via the at least one of the plurality of transducer elements.

2. The apparatus of claim 1, wherein the energy is conveyed at a specific wavelength that impedance-matches a material in each of the plurality of transducer elements, and wherein each of the plurality of transducer elements is sufficiently small to convert a sufficient amount of the energy at the specific wavelength for achieving transduction to harvest power after the energy is attenuated through a given attenuation medium.

3. The apparatus of claim 2, wherein the given attenuation medium is one of animal tissue and human tissue, and wherein the plurality of transducer elements is further configured and arranged for implantation at a certain depth in the tissue for conveying electrical signals through the tissue.

4. The apparatus of claim 1, wherein each of the plurality of transducer elements is configured and arranged to convert energy conveyed via the multi-directional radiation pattern by converting mechanical energy conveyed via mechanical waves.

5. The apparatus of claim 1, wherein each of the plurality of transducer elements is configured and arranged to convert energy conveyed via the multi-directional radiation pattern by converting sound energy conveyed via sound pressure waves emitted from a source transducer along the axis, the source transducer being aligned to respective ones of the plurality of transducer elements along the different off-axis angles.

6. The apparatus of claim 1, wherein the plurality of transducer elements further includes another transducer element that is aligned with the multi-directional radiation pattern and that provides another one of the individual energy-transduction areas to which the collective energy-transduction area corresponds.

7. The apparatus of claim 1, wherein the plurality of transducer elements are arranged at respective positions in a two-dimensional array, ones of the respective positions being offset from the axis upon which the energy is conveyed and located relative to one another such that different ones of the transducer elements receive respective portions of a common energy wave that are conveyed at different off-axis angles.

8. The apparatus of claim 1, wherein each of the plurality of transducer elements is impedance-matched with the power-accumulation circuit.

9. The apparatus of claim 1, wherein the plurality of transducer elements are configured and arranged to convert the energy by converting acoustic waves into current flow, and to charge a capacitor via the current flow.

10. The apparatus of claim 9, wherein the plurality of transducer elements are configured and arranged to rectify the current flow, whereby each of the transducer elements provide a charge having a common polarity, relative to charge provided by other ones of the transducer elements.

11. The apparatus of claim 1, wherein
the plurality of transducer elements are configured and arranged to convert the energy by converting acoustic waves into current flow, and
the power-accumulation circuit is configured and arranged with the plurality of transducer elements to charge at least one capacitor via the current flow, the current flow in at least one of the transducer elements being rectified to provide a charge of a common polarity, and to power a circuit using charge stored on the at least one capacitor.

12. A method comprising:
providing a collective energy-transduction area via a plurality of transducer elements, the collective energy-transduction area corresponding to a plurality of individual energy-transduction areas respectively defined by the plurality of transducer elements;
using the plurality of transducer elements to convert energy waves conveyed and received via a multi-directional radiation pattern into electrical charge, with each of the plurality of transducer elements being arranged at different respective off-axis angles relative to other ones of the transducer elements, wherein converting energy includes converting conveyed energy that is different in phase at respective ones of the plurality of transducer elements, and rectifying a current corresponding to energy received via at least one of the plurality of transducer elements; and
accumulating electrical charges from each of the plurality of transducer elements, such that the energy waves reach the plurality of individual energy-transduction areas at the different respective off-axis angles contribute to the accumulation of electrical charges.

13. The method of claim 12, further including selecting a size and number of the transducer elements based upon a selected power and depth into a human body, and implanting the transducer elements in tissue of the human body, wherein using the plurality of transducer elements to convert energy conveyed via a multi-directional radiation pattern includes converting energy conveyed via tissue in the human body.

14. The method of claim 12, wherein converting energy includes converting one of mechanical energy conveyed via mechanical waves and sound energy conveyed via sound pressure waves, received from a source transducer emitting one of the mechanical waves and sound pressure waves along the axis, with the source transducer being aligned to respective ones of the plurality of transducer elements along the different off-axis angles.

15. The method of claim 12, further including arranging the plurality of transducer elements at respective positions in a two-dimensional array, ones of the respective positions being offset from the axis upon which the energy is conveyed.

16. The method of claim 12, wherein converting energy includes converting acoustic waves into current flow, further including rectifying the current flow, charging at least one capacitor via the current flow, and powering a circuit using charge stored on the at least one capacitor.

17. An apparatus comprising:
a plurality of transducer elements at different respective off-axis angles relative to other ones of the transducer elements, the transducer elements having a size that is smaller than a wavelength of conveyed energy and being configured and arranged to generate current using the energy conveyed and received via acoustic waves;
a first circuit configured and arranged to rectify the generated current of the transducer elements; and
a second circuit configured and arranged to accumulate electrical charge from all of the transducer elements, using rectified current provided via the first circuit, wherein energy conveyed to each of the transducers at the different respective off-axis angles contributes to the accumulation of electrical charge.

18. An apparatus comprising:
a plurality of transducer elements configured and arranged to convert energy waves conveyed into electrical charge, each of the plurality of transducer elements having a size that is smaller than a wavelength of the conveyed energy and being arranged at different respective off-axis angles relative to other ones of the transducer elements; and
a power-accumulation circuit configured and arranged to accumulate energy, from each of the plurality of transducer elements, including energy received at the different off-axis angles at respective ones of the plurality of transducer elements.

19. The apparatus of claim 18, wherein the plurality of transducer elements are configured and arranged to convert the energy waves as received out of phase relative to one another, and the power-accumulation circuit is configured and arranged to accumulate the energy by incoherently accumulating the energy.

20. An apparatus comprising:
a plurality of transducer elements configured and arranged to convert energy waves conveyed into electrical charge, each of the plurality of transducer elements being arranged at different respective off-axis angles relative to other ones of the transducer elements, and at least one of the plurality of transducer elements being configured and arranged to convert conveyed energy that is different in phase from the conveyed energy as received by another one of the plurality of transducer elements; and a power-accumulation circuit configured and arranged to accumulate energy, from each of the plurality of transducer elements, including energy received at the different off-axis angles at respective ones of the plurality of transducer elements, by rectifying a current corresponding to energy received via the at least one of the plurality of transducer elements.

* * * * *